No. 642,584. Patented Feb. 6, 1900.
C. G. COLLINS.
REDUCTION OF METALLIC ORES.
(Application filed May 20, 1899.)

(No Model.)

Witnesses:
D. W. Gardner.
J. Rooney.

Inventor:
Caleb G. Collins
By his Attorney
Geo. Wm Miatt

UNITED STATES PATENT OFFICE.

CALEB G. COLLINS, OF WOODSMERE, NEW YORK, ASSIGNOR TO CALVIN AMORY STEVENS, OF NEW YORK, N. Y.

REDUCTION OF METALLIC ORES.

SPECIFICATION forming part of Letters Patent No. 642,584, dated February 6, 1900.

Original application filed February 21, 1898, Serial No. 671,062. Divided and this application filed May 20, 1899. Serial No. 717,540. (No specimens.)

*To all whom it may concern:*

Be it known that I, CALEB G. COLLINS, a citizen of the United States, residing at Woodsmere, Nassau county, and State of New York, have invented certain new and useful Improvements in Reduction of Metallic Ores; of which the following is a specification sufficient to enable others skilled in the art to which the invention appertains to make and use the same.

The object of my invention is to afford a preliminary treatment of metallic ores which will effect such chemical changes therein as will make the resulting material more thoroughly amenable to subsequent treatment for the economical extraction of metals or metallic compounds.

The essential feature of my invention consists in treating the ore in reduced, comminuted, or powdered form, mixed with either fluorid of calcium or fluorid of aluminium, sodium, or barium, or with any combination of said fluorids, to moist heat and agitation simultaneously.

I am aware that fluorids have been and are to some extent now used as a flux to promote fusion of ores; but my method does not involve a process of fusion, the heat which I employ being so low that the dry powdered condition of the admixture is not changed nor are the component parts melted, the whole remaining simply a mechanical admixture in so far as the heating is concerned.

The present application is a subdivision of my concurrent application, Serial No. 671,062, filed February 21, 1898, in which I claim specifically treating a comminuted admixture of ore and metallic fluorid at a heat below that of fusion to the transforming or catalytic action of a gaseous reagent. The novelty in this case consists in substituting a water vapor for the gaseous reagent therein set forth.

Figure 1:
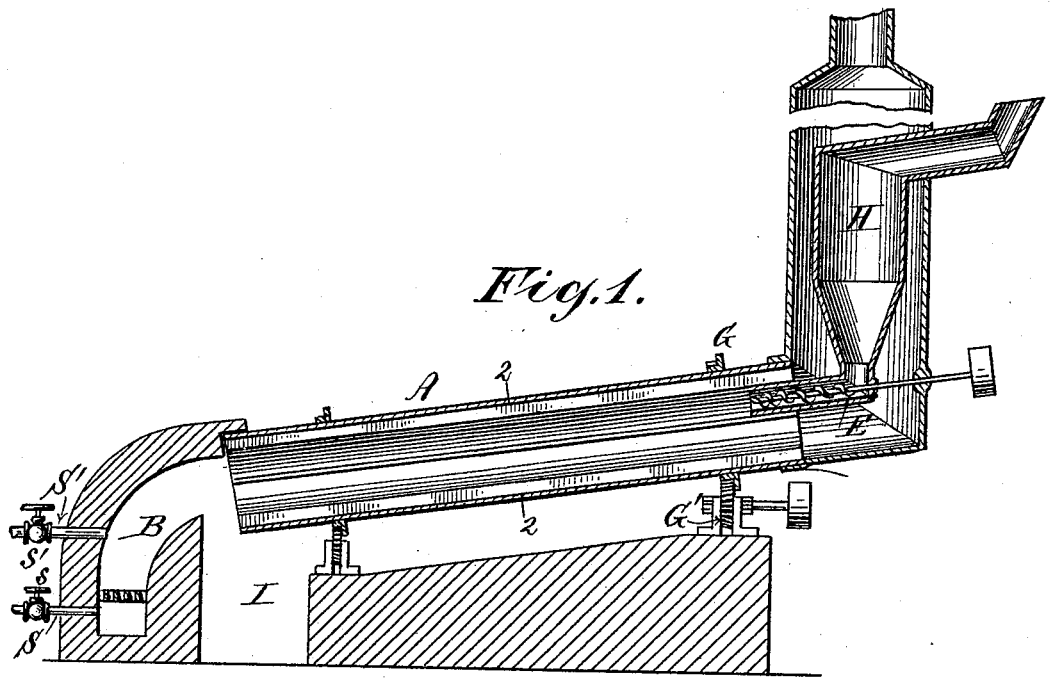
Figure 2:
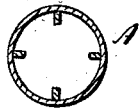

In the accompanying drawings, which illustrate symbolically apparatus which may be employed in carrying out my improved process, Figure 1 is a vertical longitudinal section of a reducing-furnace and connections. Fig. 2 is a cross-section upon plane of line 2 2, Fig. 1.

It is to be understood that I do not confine myself to the form and construction of apparatus herein shown and described, since the process may be carried on by the aid of other apparatus.

As shown, A is a rotatable iron cylinder lined with a refractory material, as fire-brick, and provided with longitudinal shelves internally to carry over and mix the material contained in the cylinder. In lieu of the said shelves any suitable or well-known means of agitating the mixture may be used. For instance, if the cylinder is not rotatable an agitating or forwarding screw blade or blades may be employed.

The cylinder A connects the furnace B with the chimney C, the products of combustion passing from the furnace into contact with the material in the cylinder A and the material gradually working its way into the dumping-space I behind the furnace.

The material to be treated is fed into a hopper H, preferably situated in the chimney, and is transferred from the lower end of the hopper to the rotatable cylinder A by means of a screw-feed E or equivalent expedient. The rotation of the cylinder A may be effected by gears G G' or otherwise.

S S' are steam-pipes, one, S, entering the furnace below the grate and the other, S', entering the furnace above the grate, said pipes being furnished with valves $s$ $s'$.

To illustrate the practical use of my process, we will take the case of auriferous quartz of the kind that, by reason of the presence of tellurium, antimony, or bismuth, is refractory to treatment by amalgamation and cyanides. Such refractory ore is reduced to powder by any usual or suitable means and then the powdered quartz is mixed with a finely-powdered fluorid in a proportion of less than fifteen per cent. to the ore, varying with relation to the character of the latter, and the mixture is fed through the hopper H and into the upper end of the inclined cylinder A by means of a feed-screw blade E, where it is continually turned over and agitated more or less during its passage to the lower end of the cylinder.

During the passage of the material through the cylinder the hot carbon dioxid from the furnace gases, together with water vapor in the air which feeds the fire or which is injected above the fire through the pipe S', passes up through and over the powdered and moderately-heated mixture of ore and fluorid and acts in such manner upon the powdered fluorid as to produce hydrogen fluorid in a condition of very unstable combination between its own two components. The hydrogen fluorid immediately attacks the tellurium, bismuth, or antimony if associated with the metals in the ore, thus placing the metal in a condition to be easily and thoroughly extracted by amalgamation or by any other of the several well-known processes. At the same time that the fluorin leaves the powdered calcium fluorid a portion of the hot carbon dioxid gas present parts with its oxygen to the calcium with the production of caustic lime in the form of fine powder and evolution of carbon monoxid gas. This caustic lime so produced has a purifying tendency, particularly upon sulfureted and arseniureted ores.

In the case of barium fluorid the reaction would be the same as with calcium fluorid. In case of sodium fluorid the reactions are the same as with sodium, except that the alkali resulting from the reaction is left in a much more soluble condition.

Some ores are better treated by admitting steam into the furnace above the fire, while with other ores the action is better if the steam is injected below the fire-grate, so that it will be decomposed with elimination of free hydrogen. Where the quantity of impurities in the ore is small or where the proportion of metal in the powdered ore is very small, then the watery vapor naturally existing in the air which feeds the fire is sufficient to effect the decomposition of enough fluorid to purify the small amount of metal present in the powdered ore.

When the fluorin calcium, barium, or sodium is used, the decomposition of the fluorids by the hydrogen and carbon dioxid sets free a caustic base from the fluorid used in a condition of fine powder, and any of these strong bases under the influence of heat materially aid in the purification of the metal. The attrition of the powdered rock with these bases caused by the rolling motion of the cylinder or by other suitable means aids the chemical action of the bases on the impurities of the metal, and as all of the solid ingredients are in a state of fine powder intimately blended the action of the hydrogen fluorid on the impurities is practically instantaneous, there being no escape of unused fluorin up the chimney if an excess of steam or hydrogen is avoided. Without the presence of a fluorid in the powdered mixture hot steam of itself has very little effect on tellurid compounds and on metallic compounds of bismuth and antimony. The chemical affinity of fluorin for tellurium, bismuth, antimony, and arsenic is stronger than that of oxygen or hydrogen for these elements, and when the fluorin acts on these substances at the instant when it, the fluorin, is freed from a previous combination, as in my process, the reaction is so quick and energetic that all of the fluorid decomposed is utilized unless, as said before, an excess of steam or hydrogen is fed into the apparatus.

In my process the fluorids are in no sense used as a flux for ores, as in many older methods, the heat which I use being much below that of fusion, the mixture of powdered ore and fluorin by my method never fusing nor even fritting together, but remaining to the end of the treatment a loose entirely nonadherent powder in the best possible condition for the perfect extraction of the metal.

What I claim as my invention, and desire to secure by Letters Patent, is—

The process of preparing ores for the extraction of metal which consists in mixing the powdered ore with a powdered fluorid and subjecting the mixture to a temperature below the fusion-point in the presence of water vapor substantially as and for the purpose specified.

CALEB G. COLLINS.

Witnesses:
D. W. GARDNER,
GEO. WM. MIATT.